(12) United States Patent
Briggs et al.

(10) Patent No.: US 7,729,006 B2
(45) Date of Patent: Jun. 1, 2010

(54) METHOD AND APPARATUS FOR IMPROVING THE PERFORMANCE OF A HOST-BASED COLOR PRINTING SYSTEM

(75) Inventors: Randall Don Briggs, Boise, ID (US); Jay Russell Shoen, Boise, ID (US)

(73) Assignee: Marvell International Technology Ltd. (BM)

( * ) Notice: Subject to any disclaimer, the term of this patent is extended or adjusted under 35 U.S.C. 154(b) by 1078 days.

(21) Appl. No.: 11/143,148

(22) Filed: Jun. 2, 2005

(65) Prior Publication Data

US 2006/0274336 A1    Dec. 7, 2006

(51) Int. Cl.
G03F 3/08 (2006.01)
(52) U.S. Cl. .................. 358/1.9; 358/518; 358/3.06; 358/1.15
(58) Field of Classification Search ............. 358/1.15, 358/1.9, 518, 3.06; 709/223
See application file for complete search history.

(56) References Cited

U.S. PATENT DOCUMENTS

| | | | |
|---|---|---|---|
| 6,237,079 B1* | 5/2001 | Stoney | 712/34 |
| 2001/0003483 A1* | 6/2001 | Muramoto | 358/1.9 |
| 2003/0233443 A1* | 12/2003 | Hirai et al. | 709/223 |
| 2004/0075859 A1* | 4/2004 | Jacobsen et al. | 358/1.15 |

* cited by examiner

Primary Examiner—Benny Q Tieu
Assistant Examiner—Qian Yang

(57) ABSTRACT

A host-based color printing system having a color printing accelerator module that assists the host processor in order to speed up the rate at which color formatting tasks are performed by the host. The color printing accelerator module has an I/O interface that connects to a first I/O port of the host computer of the host-based color printing system. A second I/O port of the host computer connects to an I/O interface of the printer. After the color formatting tasks have been performed by the host computer and the color printing accelerator module, the processed data is sent from the host computer to the printer for printing.

22 Claims, 5 Drawing Sheets

METHOD AND APPARATUS FOR IMPROVING THE PERFORMANCE OF A HOST-BASED COLOR PRINTING SYSTEM

BACKGROUND OF THE INVENTION

In the color printing industry, two types of color printing systems dominate, namely, host-based color printing systems and page description language (PDL)-based color printing systems. In host-based color printing systems, the host computer (e.g., a personal computer (PC)) rather than the printer performs most of the computations associated with performing the print job. Because the printer does not need to perform color print formatting operations, a relatively inexpensive printer with relatively inexpensive hardware can be used for color printing. In PDL-based color printing systems, the printer rather than the host performs most of the computations associated with performing the print job. Therefore, the printers that are used in PDL-based color printing systems require more sophisticated hardware than those used in host-based color printing systems and are typically more expensive.

FIG. 1 illustrates a block diagram of a typical known host-based color printing system 1. The system 1 includes a host computer 2, which is typically a PC, a printer 3 and a Universal Serial Bus (USB) interface 4. The printer 3 and the host computer 2 are interconnected by the USB interface. When a user instructs the host computer 2 to perform a color print job, a rasterizer 5 of the host computer 2 rasterizes the image data and outputs the rasterized image data to a color space converter 6. The color space converter 6 performs an algorithm that converts red, green, blue (RGB) pixel data into cyan, magenta, yellow, black (CMYK) data.

The CMYK data generated by the color space converter 6 is provided to a print quality processor 7. The print quality processor 7 performs tasks such as edge detection, trapping, sharpening and coring.

The processed image data output from the print quality processor 7 is delivered to a halftoner 8. The halftoner 8 performs an algorithm that generates patterns made up of dots of the primary colors (CMYK) that together produce shading that gives the printed image the appearance of continuous color tones.

The output of the halftoner 8 is provided to a data compressor 9, which compresses the data in accordance with a compression algorithm, such as an algorithm that complies with the Joint Bi-Level Image Experts Group (JBIG) standards. The compressed image data is then transmitted over the USB interface 4 from the host computer 2 to the printer 3. The printer 3 receives the compressed image data and stores it in memory (not shown) of the printer 3. Compressing the image data provides the USB connection with more bandwidth, and requires less memory in the printer. The printer then reads the image data from memory, decompresses it and sends it to the print engine (not shown), which prints the color-formatted image.

The processing tasks performed by the printer 3 are small in comparison to those performed by the host computer 2. Therefore, the printer 3 may be a relatively inexpensive printer having only the hardware needed to decompress the compressed image and print it.

FIG. 2 illustrates a block diagram of a known PDL-based color printing system 10. In the PDL-based system 10, the host computer 11 performs a relatively small amount of the tasks compared to those performed by the printer 12. The printer 12 typically includes a higher performance processor than that included in printer 3 of system 1, and an application specific integrated circuit (ASIC). Some of the tasks performed in the printer 12 are performed in software that is executed by the printer processor and others are performed in hardware of the printer ASIC. The incorporation of the processor and ASIC into the printer 12 increases the cost of the printer in comparison to the cost of the printer 3 of the host-based system 1 shown in FIG. 1.

The host computer 11 generates a PDL file that describes the color print job to be performed and transfers it via the USB connection 13 to the printer 12. The PDL file describes the primitive drawing objects and fonts that make up the printed page as well as their placement on the page. Examples of commonly used PDLs are Printer Control Language (PCL) by Hewlett-Packard Company and Postscript by Adobe Systems Incorporated. The printer 12 includes a PDL interpreter 14 that interprets the PDL file and performs rasterization. The blocks 15-19 shown in FIG. 2 then perform the tasks described above with reference to blocks 5-9, respectively, shown in FIG. 1.

As PCs continue to become more powerful, it has become even more desirable to harness the PCs' ability to perform the computations associated with color formatting. However, as PCs have continued to become more powerful, the performance capabilities of color printer mechanisms have also continued to improve. In particular, the page per minute (PPM) rate at which color printers are capable of printing continues to increase. The increase in the PPM rate taxes the host computer processor of the host-based color printing system. In general, PCs are not keeping up with the increased capabilities of color printers.

Increases in the PPM rate do not pose as much of a problem for PDL-based color printing systems as for host-based color printing systems because the printer hardware of PDL-based color printing systems is capable of keeping up with increases in the PPM rate. However, as indicated above, printers that have such hardware are relatively expensive compared to printers that do not have it, such as printers of the type typically used in host-based color printing systems. It would be desirable to provide a host-based color printing system that is capable of performing at a level comparable to that of PDL-based color printing systems. It would also be desirable to provide a host-based color printing system that has improved performance over currently available host-based color printing systems and that does not require an expensive printer having expensive hardware.

SUMMARY OF THE INVENTION

The invention provides a method, apparatus and system for performing host-based color printing. The host-based color printing system of the invention comprises a host computer having at least first and second I/O ports, a color printing accelerator connected to the first I/O port of the host computer, a connector, and a printer having an I/O port that is connected by the connector to the second I/O port of the host computer.

The apparatus of the invention comprises a color printing accelerator for use with a host computer of a host-based color printing system. The accelerator is configured to connect to a first I/O port of the host computer. The host computer has a second I/O port for connection to a printer. The color printing accelerator comprises an I/O interface for receiving data sent from the host computer to the color printing accelerator and for sending data from the color printing accelerator to the host computer. Print quality processing logic in the color printing accelerator performs print quality processing on the data.

In accordance with the method of the invention, color space conversion is performed in the host computer to convert red, green, blue (RGB) data into cyan, magenta, yellow and black (CMYK) data. The CMYK data is then sent over an I/O interface of the host computer to an I/O interface of a color printing accelerator. Print quality processing is then performed in the color printing accelerator. Then, in either the host computer or the color print accelerator, halftoning is performed. Then, in either the host computer or the color print accelerator, data compression is performed. The host computer then sends the compressed data from the host computer to a printer for printing.

These and other features and advantages of the invention will become apparent from the following description, drawings and claims.

DETAILED DESCRIPTION OF THE INVENTION

In accordance with the invention, a host-based color printing system is provided with an accelerator module that assists the host computer in order to speed up the rate at which color formatting tasks are performed by the host computer. The accelerator module preferably is modeled after a user-pluggable flash memory device, which is often referred to as a "jump drive." However, the accelerator module of the invention contains host-based color printing acceleration hardware rather than flash memory. Like the flash-based jump drive, the accelerator module of the invention in accordance with the preferred embodiment is a user-pluggable module that is easy to install and user friendly.

Figure 3:
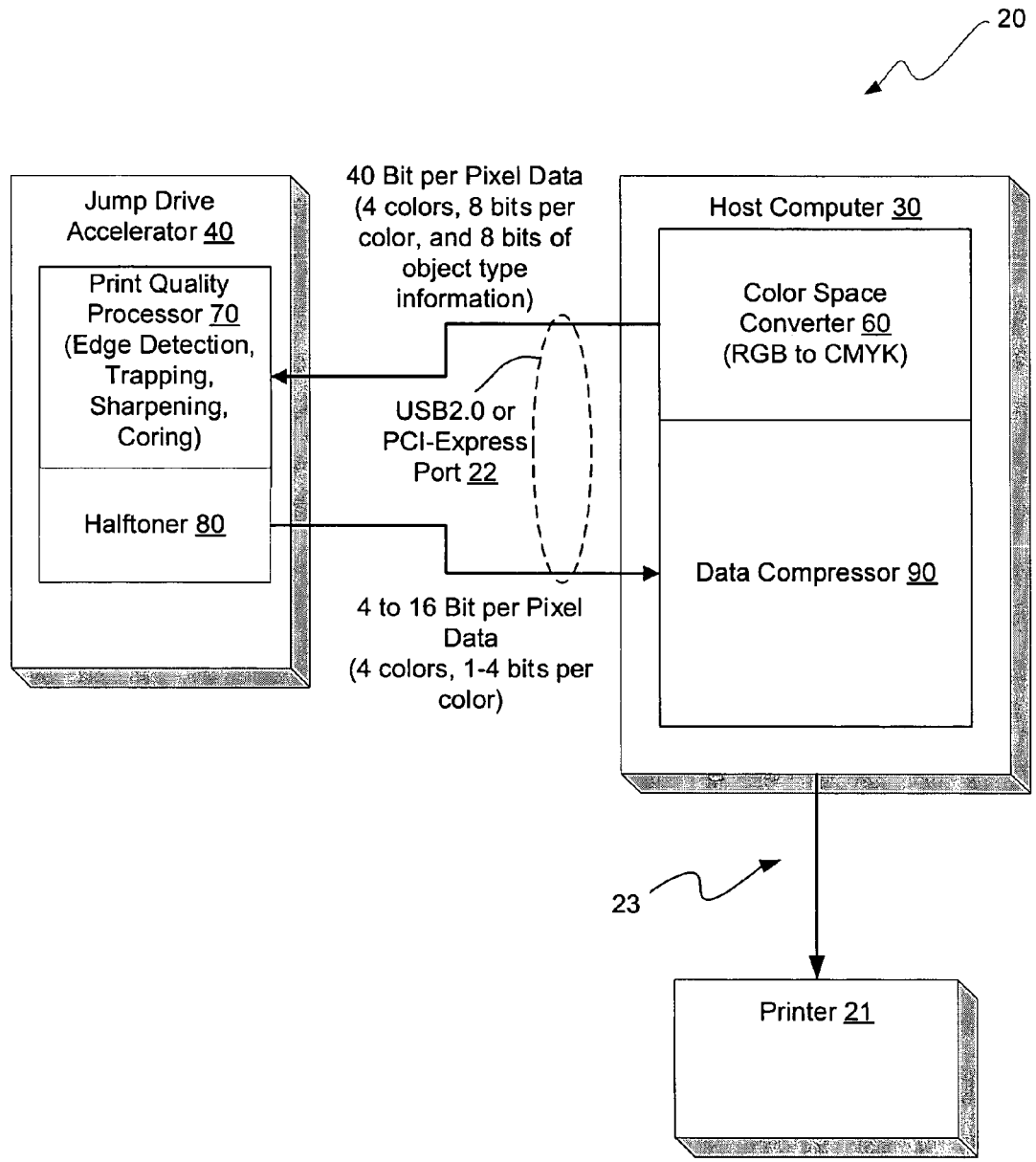
FIG. 3 illustrates a block diagram of the host-based color printing system of the invention in accordance with an exemplary embodiment.

FIG. 3 illustrates a block diagram of the host-based color printing system 20 of the invention in accordance with an exemplary embodiment. In accordance with this embodiment, the accelerator module 40 of the invention plugs into an I/O interface 22 on the host computer 30, such as, for example, a USB 2.0 or a PCI-Express I/O interface. A printer 21 connects to a second USB or Peripheral Component Interconnect (PCI)-Express I/O interface 23 on the host computer 30. The printer 21 may be a relatively simple, inexpensive formatting printer that prints raster. Preferably, all of the other printing tasks are performed by the combination of the host computer 30 and jump drive accelerator 40.

FIG. 3 illustrates one example of the division of these tasks between the host computer 30 and the accelerator module 40. In accordance with this embodiment, the host computer 30 includes a color space converter 60 for performing color space conversion and a data compressor 90 for performing data compression. The accelerator module 40 includes a print quality processor 70 for performing print color processing and a halftoner 80 for performing halftoning. In one possible implementation, each pixel that is output by the color space converter 60 is represented by 40 bits. Of these 40 bits, 32 bits represent the four colors (8 bits per color) and the other 8 bits represent object type information. These bits are then processed by the print quality processor 70 and by the halftoner 80. After halftoning has been performed, the processed data is sent back over the USB or PCI-Express interface 22 to the host computer 30. Halftoning reduces the number of bits being used to represent the data. In one possible implementation, each pixel that is sent back over I/O interface 22 is represented by 4 to 16 bits (1 to 4 bits used to represent each of the 4 colors). The data compressor 90 compresses the data sent back to the host computer 30 after halftoning and sends it over the second I/O interface 23 to the printer 21, which prints the image.

Figure 1:
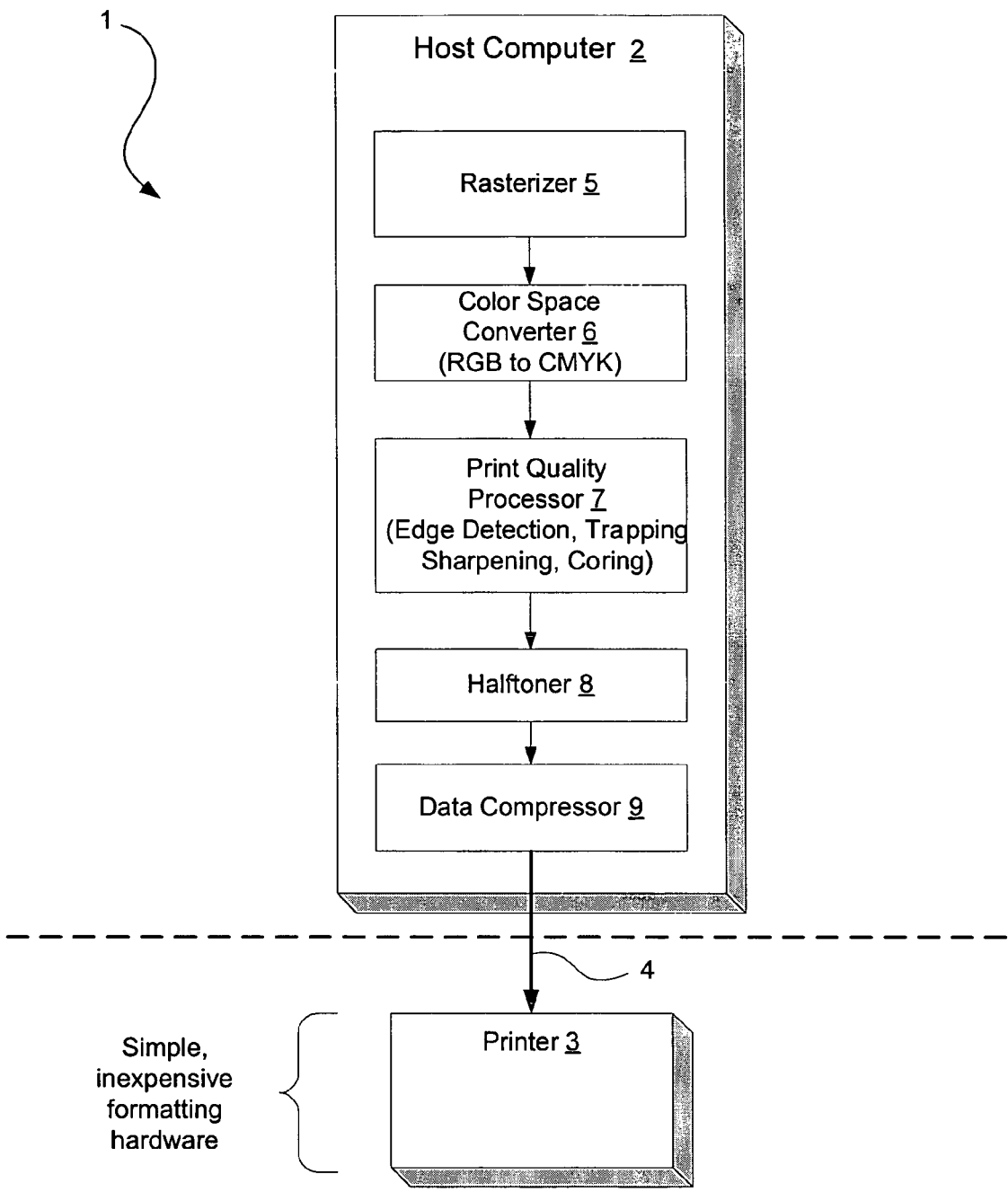
FIG. 1 illustrates a block diagram of a typical known host-based color printing system.
Figure 2:
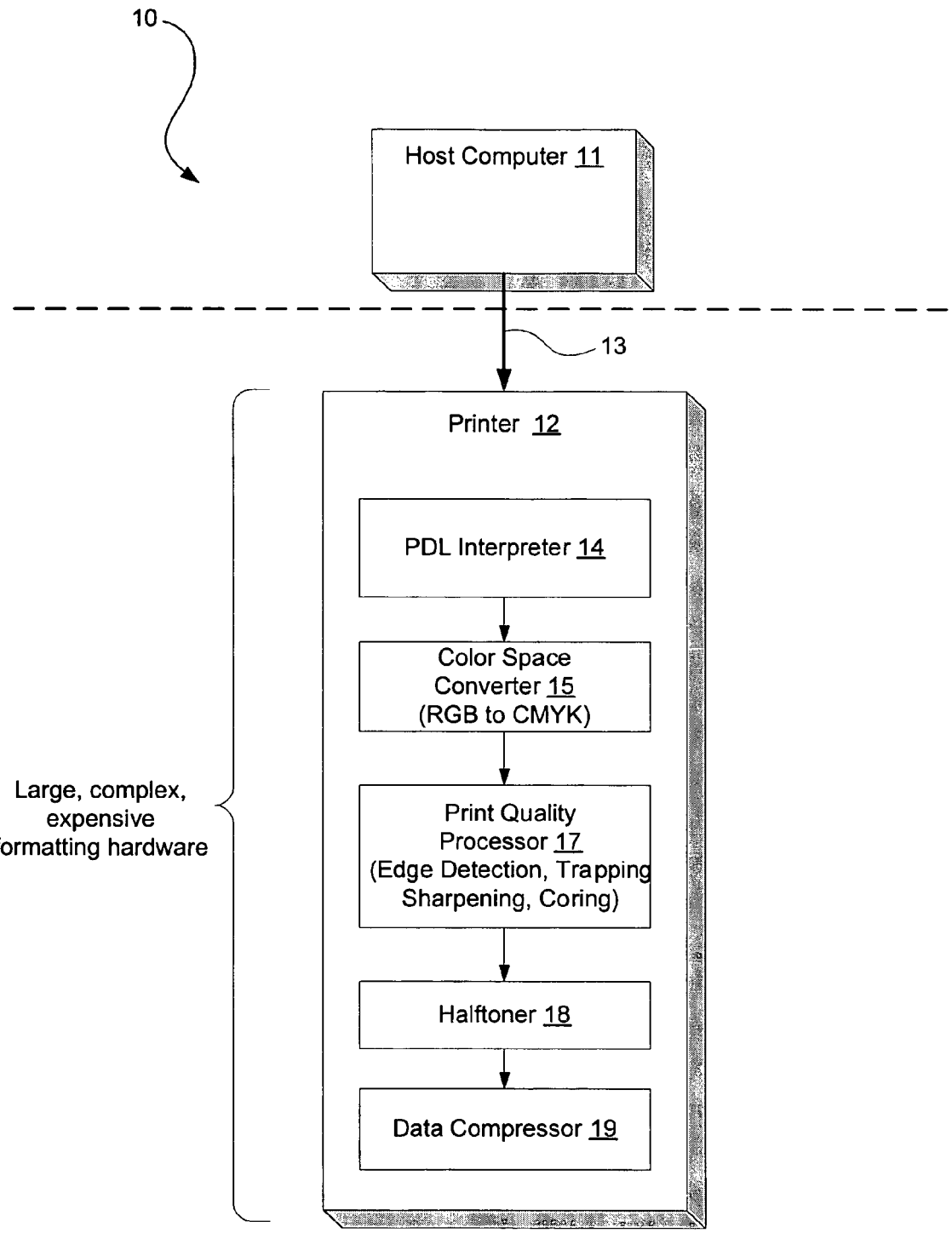
FIG. 2 illustrates a block diagram of a typical known PDL-based color printing system.

The color space converter 60, the print quality processor 70, the halftoner 80 and the data compressor 90 typically perform algorithms identical to the algorithms performed by the color space converter 6, the print quality processor 7, the halftoner 8 and the data compressor 9, respectively, shown in FIG. 1. Various manners in which these algorithms can be performed are well known in the art. Therefore, in the interest of brevity, no further description of these algorithms will be provided.

It should be noted that the division of the tasks between the host computer 30 and the accelerator module 40 may be different from what is shown in FIG. 3. FIG. 3 depicts the host computer 30 performing color space conversion and data compression because the host computer 30 is capable of efficiently performing these tasks in software being executed by a processor (not shown) of the host computer 30. However, one or both of these tasks may instead be performed in hardware in the accelerator module 40. Likewise, FIG. 3 depicts print quality processing and halftoning being performed in hardware in the jump drive accelerator 40. This is because these tasks are data and computationally intense and are more efficiently performed in hardware. However, it is not necessary that both of these tasks be performed in hardware in the accelerator module 40. For example, halftoning could be performed in the host computer 30 rather than in the accelerator module 40. Because print quality processing is the most computationally intensive task of all of the color formatting tasks, preferably it is only performed in hardware in the accelerator module 40.

One of the advantages of the invention is that tasks are performed in parallel in the accelerator module 40 and in the host computer 30. The accelerator module 40 essentially accelerates the performance of color print formatting tasks by the host-based system 20, which, in turn, allows the host computer 30 to keep up with the capability of printers to print at high PPM rates. In addition, the accelerator module 40 is easy to install. As stated above, preferably the accelerator module 40 plugs into the host computer 30. Most PCs being sold today have one or more USB ports on the front of them that users can plug USB-compliant devices (e.g., flash memory sticks) into for use with the PC. The accelerator module 40 may be configured to plug into such a USB port on a PC. The user will simply plug the accelerator module into the PC when installing the printer.

One alternative to plugging the accelerator module into the host computer is to plug it into the printer, which would require another connection between the host computer and the printer in addition to the normal connection between the printer and the PC. In this case, the accelerator module will operate in parallel with the host computer in the same manner as that described above with reference to FIG. 3. Another alternative would be to open up the host computer and install the accelerator module inside of the PC. However, this latter approach is not particularly user friendly and requires some specific technical knowledge on the part of the user.

Figure 4:
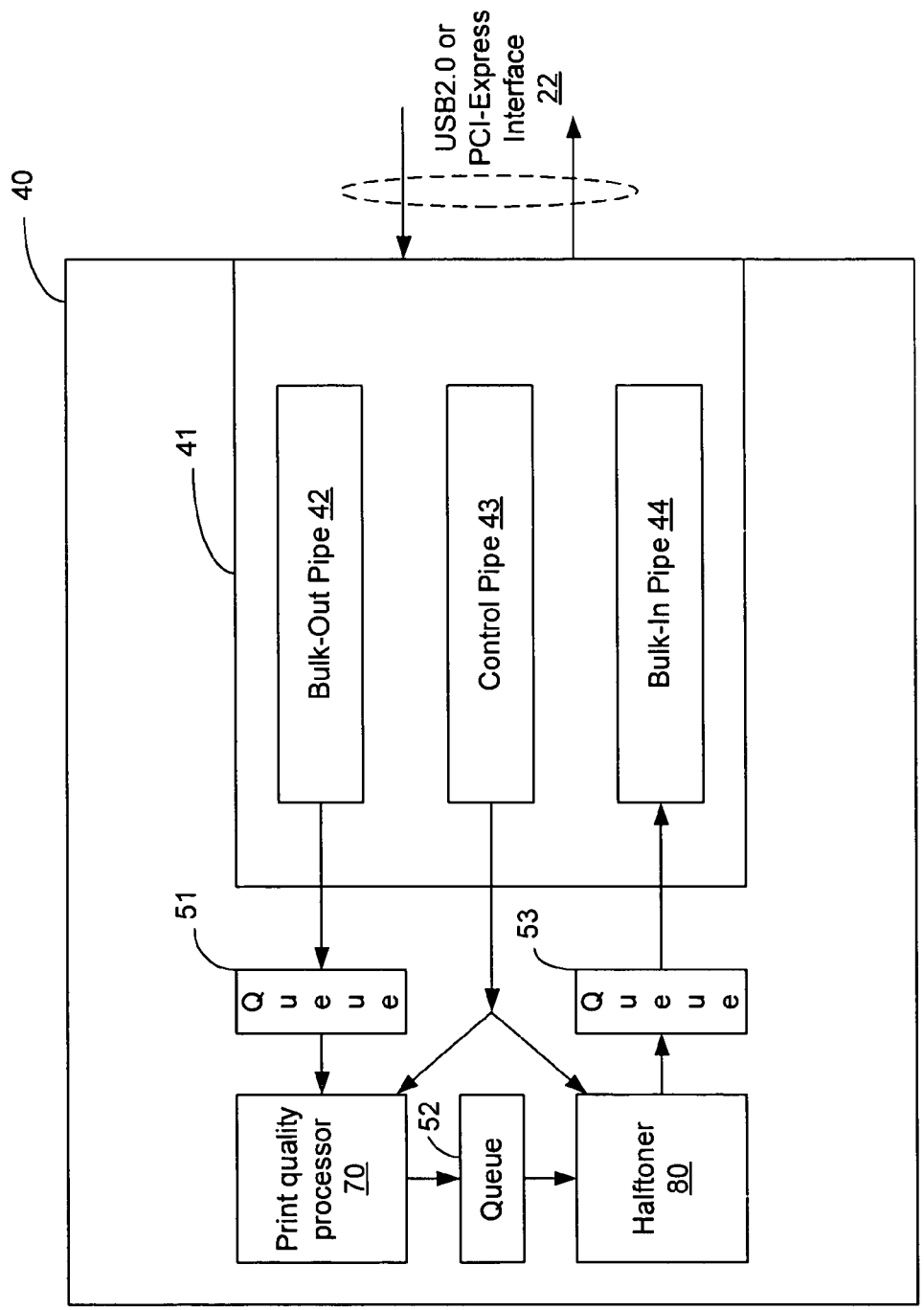
FIG. 4 illustrates a block diagram of the jump drive accelerator of the invention shown in FIG. 3 configured as a USB-compliant device.

FIG. 4 illustrates a block diagram of the accelerator module 40 of the invention shown in FIG. 3 configured as a USB-compliant device. The accelerator module 40 has a high-speed USB 2.0 interface 41. The interface 41 has a Bulk-Out pipe 42, a control pipe 43 and a Bulk-In pipe 44. The Bulk-Out pipe 42 receives the data transferred from the host computer in accordance with the USB 2.0 protocol. The data output from the Bulk-Out pipe 42 is received into a queue 51, which stores the data until it is needed by the print quality processor 70. The print quality processor 70 processes the data and outputs the processed data to a queue 52, which stores the data until the data is needed by the halftoner 80. The halftoner 80 processes the data and outputs the processed data to a queue 53, which stores the data until the data is needed by the Bulk-In pipe 44. The processed data output from the Bulk-In pipe 44 is transferred over the USB interface 22 back to the host computer 30 where it is processed by the data compressor 90 (FIG. 3) before being sent to the printer.

The Control pipe 43 performs certain tasks defined by the USB 2.0 protocol and others that are user-defined. The user-defined tasks are responsible for setting the setup configurations of the print quality processor 70 and the halftoner 80.

Figure 5:
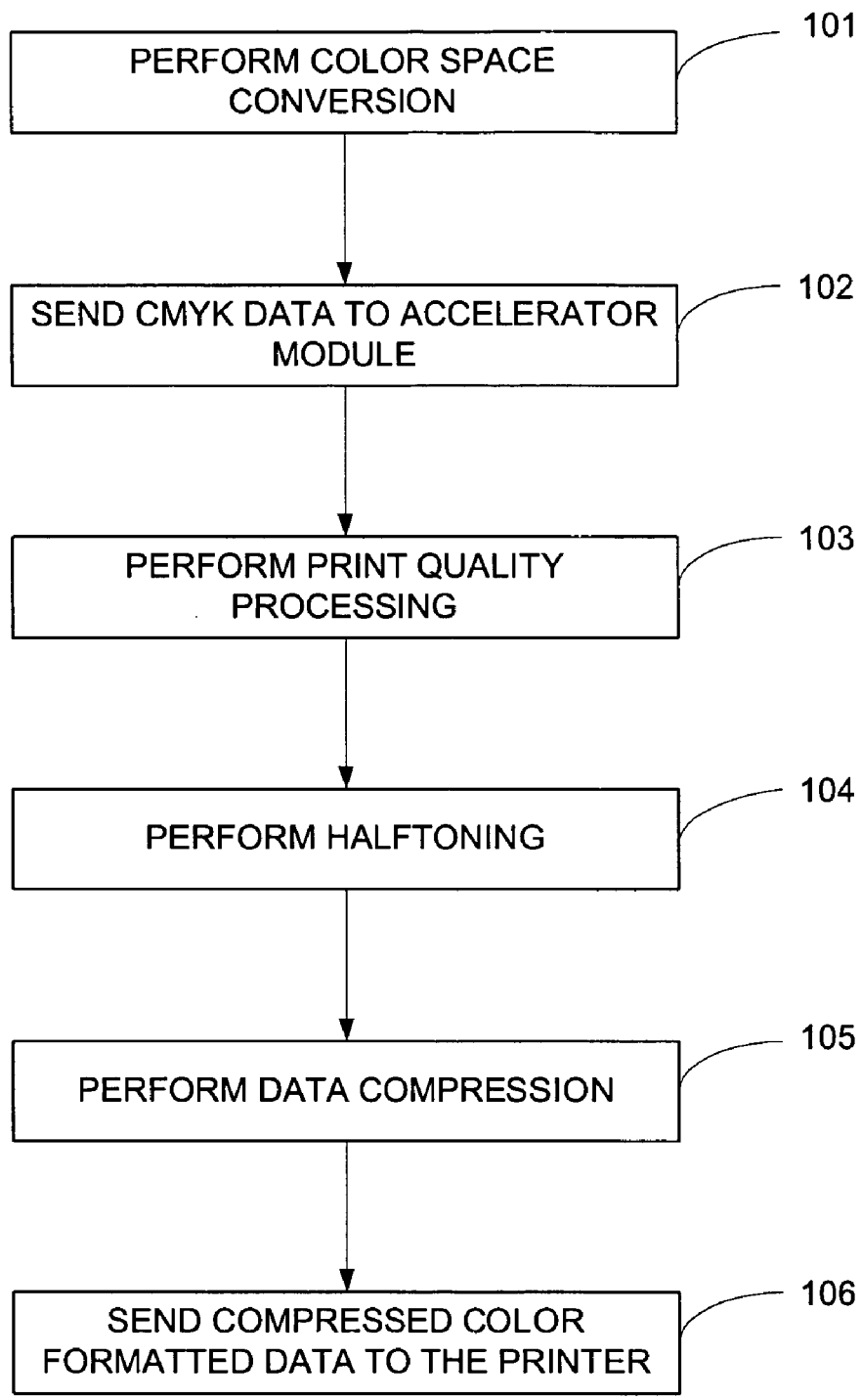
FIG. 5 illustrates a flow chart that described the method of the invention in accordance with an embodiment.

FIG. 5 illustrates a flow chart that described the method of the invention in accordance with an embodiment. The host computer performs color space conversion to convert the RGB data into CMYK data, as indicated by block 101. The host computer then sends the SMYK data via the I/O interface between the host computer and the accelerator module to the accelerator module, as indicated by block 102. The color printing accelerator then performs print quality processing on the received data, as indicated by block 103. Halftoning is then performed on the data, as indicated by block 104. Halftoning may be performed in the host computer or in the color printing accelerator module. Data compression is then performed on the halftoned data, as indicated by block 105. Like halftoning, data compression may be performed in the host computer or in the color printing accelerator module. The host computer then sends the compressed data to the printer, as indicated by block 106.

It should be noted that the invention has been described with reference to particular embodiments for exemplary purposes and that the invention is not limited to the embodiments described herein. For example, although USB and PCI-Express I/O interfaces have been specifically mentioned herein as being suitable for interfacing the host computer and the accelerator of the invention, the invention is not limited to using any particular type of interface for this purpose. Other interfaces, both publicly known interfaces and proprietary interfaces, may be used for this purpose. Those skilled in the art will understand, in view of the description provided herein, that the invention can be embodied in other forms and that the embodiments of the invention described herein can be modified, and that all such other embodiments and modifications to the embodiments described herein are within the scope of the invention.

What is claimed is:

1. A color printing accelerator module for use with a host computer of a host-based color printing system, wherein the host computer is adapted to communicate image data from a first I/O port of the host computer to a corresponding I/O port of a printer, the image data communicated from the host computer to the printer including raster image data, the color printing accelerator module comprising:

an I/O interface configured to communicate with a second I/O interface of the host computer, wherein the color printing accelerator module functions as a peripheral device solely of the host computer through the I/O interface;

image processing logic including print quality processing logic in communication with the I/O interface, the image processing logic including print quality processing logic configured to perform print quality processing on first color space image data converted by the host computer from image data in a second color space, where the image data in the second color space is received at the I/O interface from the second I/O interface of the host computer; and wherein image data processed by the image processing logic is communicated to the I/O interface for transmission to the second I/O interface of the host computer for use by the host computer in generating the raster image data that is provided from the first I/O port of the host computer to the corresponding port of the printer.

2. The color printing accelerator module of claim 1, further comprising:

halftoning logic that receives data from the print quality processing logic that has been processed by the print quality processing logic, the halftoning logic being configured to perform halftoning on the print quality processed data.

3. The color printing accelerator module of claim 1, wherein the I/O interface of the color printing accelerator module comprises a Universal Serial Bus (USB) interface for connection with a corresponding USB port of the host computer.

4. The color printing accelerator module of claim 1, wherein the I/O interface of the color printing accelerator module is a Peripheral Component Interconnect (PCI)-Express interface for connection with a corresponding PCI-Express port of the host computer.

5. The color printing accelerator module of claim 1, wherein image data is compressed by the host computer and provided to the first I/O port of the host computer to the corresponding I/O port of the printer as the raster image data.

6. A host-based color printing system comprising:

a host computer including a color space converter adapted to convert image data from a first color space to a second color space, wherein the host computer includes a first input/output (I/O) port and a second I/O port, where the second I/O port is adapted to communicate image data to a corresponding port of a printer, the image data communicated by the host computer to the printer including raster image data; and a color printing accelerator module having an I/O interface connected to the first I/O port of the host computer to provide a communication link that facilitates connection of the color printing accelerator module so that the color printing accelerator module functions as a peripheral device solely of the host computer, the color printing accelerator module having image processing logic to process the second color space image data received at the I/O interface of the color printing accelerator module from the first I/O port of the host computer, where the image processing logic communicates image data that it has processed to the I/O interface of the color printing accelerator module for transmission to the first I/O port of the host computer over the communication link, wherein the host computer uses processed image data received from the color printing accelerator module to generate the raster image data communicated to the printer.

7. The host-based color printing system of claim 6, wherein the image processing logic of the color printing accelerator module comprises:

print quality processing logic that receives color converted image data from the I/O interface of the color printing accelerator module, the print quality processing logic being configured to perform print quality processing on the color converted image data received from the I/O interface of the color printing accelerator module.

8. The host-based color printing system of claim 7, wherein the image processing logic of the color printing accelerator module further comprises:

halftoning logic that receives print quality processed data from the print quality processing logic, the halftoning logic being configured to perform halftoning on the print quality processed data received by the halftoning logic to thereby provide halftoned processed data.

9. The host-based color printing system of claim 6, wherein the I/O interface of the color printing accelerator module is a Universal Serial Bus (USB) interface and the first I/O port of the host computer is a USB port.

10. The host-based color printing system of claim 6, wherein the I/O interface of the color printing accelerator module is a Peripheral Component Interconnect (PCI)-Express interface and the first I/O port of the host computer is a PCI-Express port.

11. The host-based color printing system of claim 7, wherein the color space converter of the host computer performs color space conversion on data associated with a print job to convert red, green, blue (RGB) data into cyan, magenta, yellow and black (CMYK) data, wherein the color converted image data received at the I/O interface of the color printing accelerator module is CMYK data transferred from the host computer to the color printing accelerator module over said communication link, and wherein print quality processed image data that has been print quality processed by the print quality processing logic is transferred from the color printing accelerator module to the host computer over said communication link, and wherein the host computer performs halftoning on the print quality processed image data transferred from the color printing accelerator module to the host computer.

12. The host-based color printing system of claim 8, wherein, after the data has been halftoned, the host computer performs data compression on the halftoned processed data and sends the compressed data as the raster image data to the printer over the second I/O interface of the host computer.

13. The host-based color printing system of claim 8, wherein the color space converter of the host computer performs color space conversion on data associated with a print job to convert red, green, blue (RGB) data into cyan, magenta, yellow and black (CMYK) data, wherein the color space converted image data received by the I/O interface of the color printing accelerator module is CMYK data transferred from the host computer to the color printing accelerator module over said communication link, and wherein after halftoning has been performed, the halftoned data is sent from the color printing accelerator module to the host computer over said communication link, and wherein the host computer performs data compression on the processed halftoned data.

14. The host-based color printing system of claim 13, wherein the host computer sends the compressed image data as the raster image data to the printer over the second I/O interface of the host computer.

15. The host-based color printing system of claim 6, wherein image data is compressed by the host computer and communicated to the printer as the raster image data.

16. A method for performing color printing in a host-based color printing system, the method comprising:

in a host computer of the host-based color printing system, performing color space conversion on data associated with a print job to convert red, green, blue (RGB) data into cyan, magenta, yellow and black (CMYK) data;

sending the CMYK data over an input/output (I/O) interface of the host computer to an I/O interface of a color printing accelerator module;

in the color printing accelerator module, performing an image processing operation on the CMYK data sent to the color printing accelerator module, where the image processing operation is selected from a group of image processing operations comprising print quality processing, halftoning, and image data compression;

in the color printing accelerator module, sending image data that has been processed by the color printing accelerator module to the host computer;

in the host computer, performing a further image processing operation on the processed image data received from the color printing accelerator module, where the further image processing operation is selected from a group of image processing operations comprising halftoning and image data compression; and in the host computer, sending the compressed raster image data from the host computer to a printer for printing.

17. The method of claim 16, wherein halftoning is performed by halftoning logic in the color print accelerator module.

18. The method of claim 16, wherein halftoning is performed by logic in the host computer.

19. The method of claim 18, wherein the logic that performs halftoning comprises a processor and halftoning code which is executable by the processor.

20. The method of claim 18, wherein the logic that performs halftoning is hardware.

21. The method of claim 16, wherein data compression is performed by logic in the host computer.

22. The method of claim 16, wherein data compression is performed by logic in the color printing accelerator module.

* * * * *